United States Patent
Ban et al.

(10) Patent No.: US 10,120,731 B2
(45) Date of Patent: Nov. 6, 2018

(54) TECHNIQUES FOR CONTROLLING USE OF LOCKS

(71) Applicant: INTEL CORPORATION, Santa Clara, CA (US)

(72) Inventors: Khun Ban, Hillsboro, OR (US); Kingsum Chow, Portland, OR (US); Shirish Aundhe, Hillsboro, OR (US); Sandhya Viswanathan, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 737 days.

(21) Appl. No.: 14/129,935

(22) PCT Filed: Jul. 15, 2013

(86) PCT No.: PCT/US2013/050431
§ 371 (c)(1),
(2) Date: Dec. 28, 2013

(87) PCT Pub. No.: WO2015/009267
PCT Pub. Date: Jan. 22, 2015

(65) Prior Publication Data
US 2015/0220372 A1 Aug. 6, 2015

(51) Int. Cl.
*G06F 12/00* (2006.01)
*G06F 9/52* (2006.01)
(Continued)

(52) U.S. Cl.
CPC .................. *G06F 9/52* (2013.01); *G06F 8/70* (2013.01); *G06F 9/30076* (2013.01);
(Continued)

(58) Field of Classification Search
None
See application file for complete search history.

(56) References Cited

U.S. PATENT DOCUMENTS 5,872,980 A * 2/1999 Derrick ..................... G06F 9/52
710/200
2003/0079094 A1 4/2003 Rajwar et al.
(Continued)

OTHER PUBLICATIONS

Compiler, Feb. 2004, www.Wikipedia.com, p. 1-3.*
(Continued)

*Primary Examiner* — Henry Tsai
*Assistant Examiner* — Dean Phan

(57) ABSTRACT

Various embodiments are generally directed to techniques for controlling the use of locks that regulate access to shared resources by concurrently executed portions of code. An apparatus to control locking of a resource includes a processor component, a history analyzer for execution by the processor component to analyze at least one result of a replacement of a lock instruction of a first instance of code with a lock marker to allow the processor component to speculatively execute a second instance of code, and a locking component for execution by the processor component to replace the lock instruction with the lock marker based on analysis of the at least one result, the first and second instances of code to access a resource and the lock instruction to request a lock of access to the resource to the first instance of code. Other embodiments are described and claimed.

18 Claims, 12 Drawing Sheets

(51) Int. Cl.
*G06F 9/30* (2018.01)
*G06F 9/38* (2018.01)
*G06F 8/70* (2018.01)

(52) U.S. Cl.
CPC .......... *G06F 9/3834* (2013.01); *G06F 9/3842* (2013.01); *G06F 9/3851* (2013.01); *G06F 9/528* (2013.01)

(56) References Cited

U.S. PATENT DOCUMENTS

| | | |
|---|---|---|
| 2004/0162948 A1 | 8/2004 | Tremblay et al. |
| 2006/0095901 A1* | 5/2006 | Brokenshire ........... G06F 9/322 717/151 |
| 2010/0169623 A1 | 7/2010 | Dice |
| 2011/0093684 A1 | 4/2011 | Tene et al. |
| 2011/0153992 A1* | 6/2011 | Srinivas .............. G06F 9/45516 712/220 |
| 2012/0227045 A1* | 9/2012 | Knauth ................. G06F 9/3863 718/100 |

OTHER PUBLICATIONS

International Search Report and Written Opinion received for PCT Patent Application No. PCT/US2013/050431, dated Apr. 24, 2014, 9 pages.
Extended European Search Report received for European Patent Application No. 13889446.4, dated Feb. 13, 2017, 9 pages.

* cited by examiner

TECHNIQUES FOR CONTROLLING USE OF LOCKS

TECHNICAL FIELD

Embodiments described herein generally relate to controlling the use of locks that control access to shared resources by concurrently executed code.

BACKGROUND

Concurrent execution of multiple instances of code has become commonplace across many varieties of computing devices. Processor components incorporating multiple cores that simultaneously execute instances of code, once found only in servers, have become common in personal and embedded computing devices. While such concurrent execution of code enables greater processing performance, it also creates the need to address issues of synchronizing execution to enable sharing of resources in a manner that avoids instances of contention over those resources. Specifically, concurrently executed instances of either the same or different code may require access to the same resource (e.g., a piece of data, an input/output component, etc.) in a manner in which the state of that resource may be changed during that access by at least one of those instances. Problems can arise where the state of that resource is modified by one instance of code during its access in a manner that causes unpredictable behavior by another instance of code that concurrently accesses that same resource.

A common solution to preventing contention over a resource is locking access to that resource to just one instance of code at a time. An instance of code incorporates a lock instruction to lock access to a resource to prevent other instances of either the same code or different code from accessing that same resource as it does so. This enables that instance of code to read and/or modify the state of that resource as needed without interference from other instances of code. Upon completion of its access to that resource, the resource is unlocked to permit access by other instances of either the same or different code.

Unfortunately, while locking of resources is effective in preventing instances of contention, locking can substantially negate the processing performance advantages of concurrent execution of code. Specifically, the locking of a resource can effectively forestall further execution of other instances of code throughout the time that resource remains locked. Further, such locking may not always be necessary as there are frequently instances in which accesses to a resource by multiple instances of the same or different code may be of a nature that does not change the state of that resource such that instances of contention would not occur. Thus, there are frequent occasions in which resources are locked unnecessarily.

A developing solution to such unnecessary locking is speculative execution of code accessing the same resource. Following receipt by a processor component of an indication of one instance of code seeking to lock access to a resource, execution of another instance of either the same or different code is speculatively allowed to proceed such that the other instance is allowed to access that resource in spite of the request to lock access to it. The execution of both instances of code is monitored for the occurrence of an instance of contention. If contention is detected, then the execution of one or both of those instances of code is aborted to the extent necessary to place those instances of code and the resource in a state in which execution can recur in a manner that avoids the instance of contention. Frequently, such recurrence of execution entails repeating execution of the instance of code that originally sought to lock the resource, while not allowing the speculative execution of the other instance of code. Unfortunately, while such speculative execution may alleviate occurrences of unnecessary locking, the aborting of execution of code can also negatively affect processing performance.

DETAILED DESCRIPTION

Figure 1:
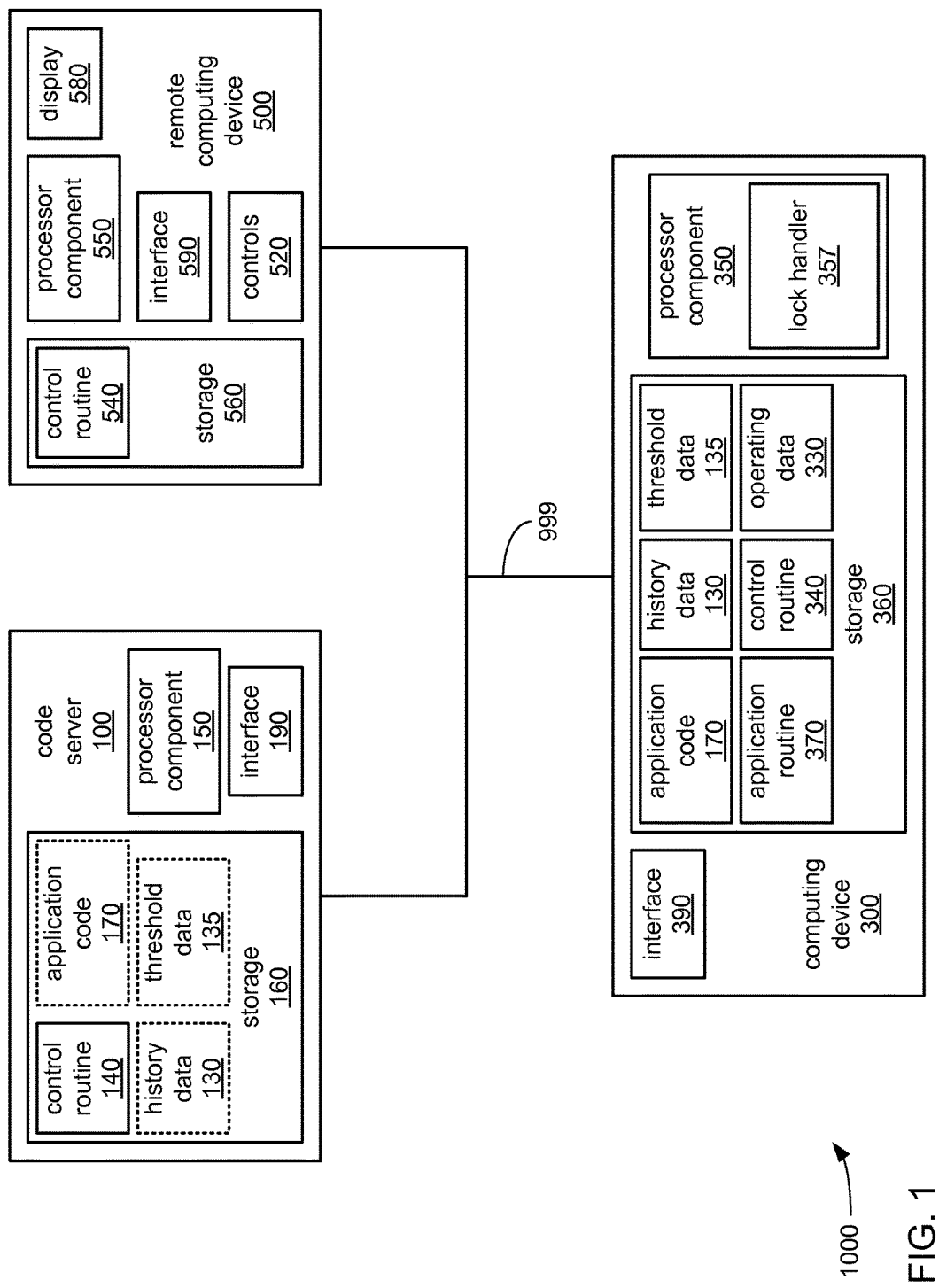
FIG. 1 illustrates an embodiment of a processing system.

Various embodiments are generally directed to techniques for controlling the use of locks that regulate access to shared resources by concurrently executed instances of code. A compiler that compiles the code of a routine as the routine is about to be executed selectively replaces a lock instruction and maybe also a related release instruction in the code with a lock marker and maybe also a release marker that informs a processor component of the presence of a resource that is sought to be locked, thereby signaling the processor component to perform speculative execution. The determination of whether to replace the lock and/or release instructions with lock and/or release markers is based, at least in part, on indications in history data of the results of prior attempts to allow resource sharing by allowing speculative execution in one or more previous compiles of the code. Following compiling of the code of the routine, the execution of the routine is monitored for an occurrence of contention over the resource. If contention occurs and it is determined that aborting of execution of the code is necessary, then the lock and release markers guide the process of aborting execution. The history data is also updated with the results of allowing speculative execution in spite of the lock instruction.

In some embodiments, the history data may specify the results of allowing speculative execution with a granularity that is per lock instruction. In other embodiments, the granularity may be per portion of the code of the routine (e.g., per callable routine or procedure). In some embodiments, the results of allowing speculative execution in spite of a particular lock instruction in the code may be indicated only for the last instance in which it was allowed. In other embodiments, the results of multiple previous attempts at allowing speculative execution for that particular lock instruction may be indicated, and the results may be specified as a statistic of a rate at which contention occurred such that aborting execution of code was necessary.

In some embodiments, the determination of whether to replace the lock instruction with the lock marker may be additionally based on how long ago the last attempt was made to allow speculative execution in spite of that lock instruction. A threshold of time since the last attempt that resulted in contention was made may be selected to trigger making another attempt. This may be deemed desirable where it is deemed possible that conditions have changed over time such that a new attempt at allowing speculative execution may not result in contention over access to a resource (or at least result in a lower rate of instances of contention).

In some embodiments, the history data may be cleared in response to a change in conditions under which execution of the routine occurs such as a change in the version of the code of the routine, a change in the version of the compiler, a change in the processor component, etc. In some embodiments, the history data may, at least initially, indicate the results of attempts of speculative execution in spite of the lock instruction by processor components of other computing devices to avoid having to recreate the history data from results of multiple executions of the routine by the processor component, thereby gaining the benefit of the results of those executions in those other computing devices.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a processing system 1000 incorporating one or more of a code server 100, a computing device 300 and a remote computing device 500. Each of these computing devices may be any of a variety of types of computing devices, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 300 and 500 exchange signals conveying application code incorporating locks and/or history data indicating results of attempting to allow speculative execution through a network 999. However, one or more of these computing devices may exchange other entirely unrelated information with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 300 incorporates one or more of a processor component 350, a storage 360 and an interface 390 to couple the computing device 300 to the network 999. The storage 360 stores one or more of an application code 170, history data 130, threshold data 135, a control routine 340, an application routine 370 and operating data 330. The processor component 350 incorporates a lock handler 357 that performs speculative execution of one or more instances of code that share a resource with another instance of code incorporating a lock marker indicative of a lock instruction to lock that resource.

In examples presented herein, the operating data 330 is presented as a resource to which access is sought to be locked by one instance of code to prevent another instance of the same or different code from concurrently accessing it. The operating data 330 may by any of variety of types of data, including and not limited to text, numeric data, bitmaps, a set of instructions, etc. However, it should be noted that despite the depictions herein of the locking of a piece of data stored in the storage 360 as the resource to which access is sought to be locked, a resource to which access is sought to be locked may be any of a variety of types of resource in various embodiments. By way of example, such a resource may be an input/output device of the computing device 300 (e.g., an interface, a support component, an input/output port), a specified range of memory and/or I/O addresses (e.g., a buffer through which components communicate), etc.

The application code 170 incorporates a sequence of instructions operative on the processor component 350 in its role as a main processor component of the computing device 300 to implement logic to perform various functions. The application code 170 exists in a form requiring compiling to be made executable by the processor component 350. More specifically, the instructions of the application code 170 may be in human-readable form (e.g., text) or in machine-readable form (e.g., byte code, etc.). The application code 170 incorporates one or more lock instructions to lock one or more resources required for access during execution. In various embodiments, the application code 170 is compiled each time it is to be executed, and may have been composed in any of a variety of programming languages often associated with so-called "just-in-time" compilation (e.g., Java).

The history data 130 incorporates indications of the results of past attempts at allowing sharing of a resource by allowing speculative execution in spite of a request by a lock instruction of the application code 170 to lock access to that resource. The history data 130 may specify these results with a granularity that is per lock instruction within the application code 170 or per portion of the application code 170. The results may be indicated only for the last attempt at allowing speculative execution, or the results of multiple previous attempts may be indicated. Where the results of multiple previous attempts are indicated, those results may be indicated as statistics of a rate at which instances of contention over a resource have occurred (or alternatively, a rate at which such contention did not occur), given the number of times that such speculative execution has been allowed. In some embodiments, the history data 130 is associated solely with the application code 170, while in other embodiments, the history data 130 may include such indications of results for other code in addition to the application code 170.

The threshold data 135 (if present) incorporates at least an indication of an interval of time from when speculative execution was last allowed and resulted in contention to when another attempt is to be made to allow sharing of a resource by again attempting the allowance of speculative execution to test whether conditions have changed sufficiently to not result in contention. The interval of time may be applied per lock instruction of the application code 170 or may be applied per portion of the application code 170.

The control routine 340 incorporates a sequence of instructions operative on the processor component 350 in its role as a main processor component of the computing device 300 to implement logic to perform various functions. In executing the control routine 340, the processor component 350 compiles the application code 170 to generate the application routine 370. In so doing, where the processor component 350 encounters a lock instruction in the application code 170, the processor component selectively replaces the lock instruction with a lock marker in the application routine 370 based on indications of past results in the history data 130.

When the application routine 370 is later executed by the processor component 350, the lock marker will provide an indication to the lock handler 357 of the existence of the lock instruction and its request to lock a specified resource (e.g., the operating data 330). However, the lock marker is not itself an instruction to actually lock that resource. The lock handler 357 uses the lock marker as an indicator of the existence of the replaced lock instruction and the location of that lock instruction in the application code 170 to trigger monitoring of accesses to that resource by instances of code for an instance of contention over that resource. As familiar to those skilled in the art, if such an instance of contention is detected, then the speculative execution component may take any of a variety of actions in response. In some embodiments, the lock handler 357 may abort execution of one or more instances of code back to the point at which the lock marker was encountered in at least one of those instances. In other embodiments, the lock handler 357 may call an abort handler of the application routine 370 (if there is one), which may effect an aborting of execution of one or more instances of code.

In executing the control routine 340, the processor component 350 may update the history data 130 with indications of the results of allowing speculative execution via the lock marker (e.g., the fact that contention did or did not occur, and/or a rate at which contention has or has not occurred). This updating of the history data 130 enables at least the most recent results of allowing such speculative execution to be taken into account the next time the application code 170 is again compiled in preparation for again being executed. It should be noted that as a result of such use of the history data 130 in each compiling of the application code 170, subsequent compiling of the application code 170 can actually generate different versions of the application routine 370 over time as different lock instructions within the application code 170 are and/or are not replaced with lock markers.

Thus, in some embodiments, the history data 130 is created entirely from indications of results of attempting to share a resource by attempting allowance of speculative execution of two or more instances of code (e.g., multiple instances of the same code or instances of different code). Those results include indications of whether contention over access to that resource occurred as a result of such speculative execution, and are used to as an input to subsequent determinations of whether or not to substitute a lock marker for a lock instruction as has been described. In such embodiments, where the history data 130 has not yet been created for the application code 170 (e.g., the application code 170 has not yet been executed, or the history data 130 has somehow been lost, cleared, deleted, etc.), the control routine 340 may default to replacing a lock instruction with a lock marker to attempt allowance of speculative execution to begin creating the history data 130 with an indication of whether contention over access to a resource is the result.

In various embodiments, the code server 100 (if present) incorporates one or more of a processor component 150, a storage 160 and an interface 190 to couple the code server 100 to the network 999. The storage 160 stores one or more of the application code 170, the history data 130, the threshold data 135 and a control routine 140. The control routine 140 incorporates a sequence of instructions operative on the processor component 150 in its role as a main processor component of the code server 100 to implement logic to perform various functions. In executing the control routine 140, the processor component 150 operates the interface 190 to provide one or more of the application code 170, the history data 130 and the threshold data 135 to at least the computing device 300.

In some embodiments, the computing device 300 may be one of multiple computing devices that may be used to provide various services (e.g., as part of server farm providing email and/or website hosting, telecommunications and/or video conferencing support, support for online commerce and/or financial transactions, etc.) via the network 999 to other computing devices, such as the remote computing device 500. As familiar to those skilled in the art, as part of such a multitude of computing devices, the computing device 300 may be routinely re-initialized in a manner that entails clearing at least some of the contents of the storage 360 such that one or more of the application code 170, the history data 130 and the threshold data 135 may need to be repeatedly provided to the computing device 300. The provision of the history data 130 to the computing device 300 after each such re-initialization precludes the need for the history data 130 to be fully recreated within the computing device 300 after each such re-initialization by attempting speculative execution for each lock instruction in the application code 170 to re-learn where such speculative execution is and is not possible without an unacceptably high rate of instances of contention in the application code 170. Thus, unnecessary losses in time and productivity arising from what may be numerous instances of "trial-and-error" to recreate the history data 130 after each such re-initialization may be avoided by the provision of the history data 130 to the computing device 300 from the code server 100.

In various embodiments, the remote computing device 500 (if present) incorporates one or more of a processor component 550, a storage 560, controls 520, a display 580 and an interface 590 to couple the remote computing device 500 to the network 999. The storage 560 stores a control routine 540. The control routine 540 incorporates a sequence of instructions operative on the processor component 550 in its role as a main processor component of the remote computing device 500 to implement logic to perform various functions. In executing the control routine 540, the processor component 550 monitors the controls 520 for indications of manual input by an operator, operates the display 580 to visually present a visual portion of a user interface, and/or operates the interface 590 to enable the operator to interact with the computing device 300 through the remote computing device 500 in embodiments in which the computing device 300 provides services to the remote computing device 500, as earlier described.

In various embodiments, each of the processor components 150, 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 190, 390 and 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
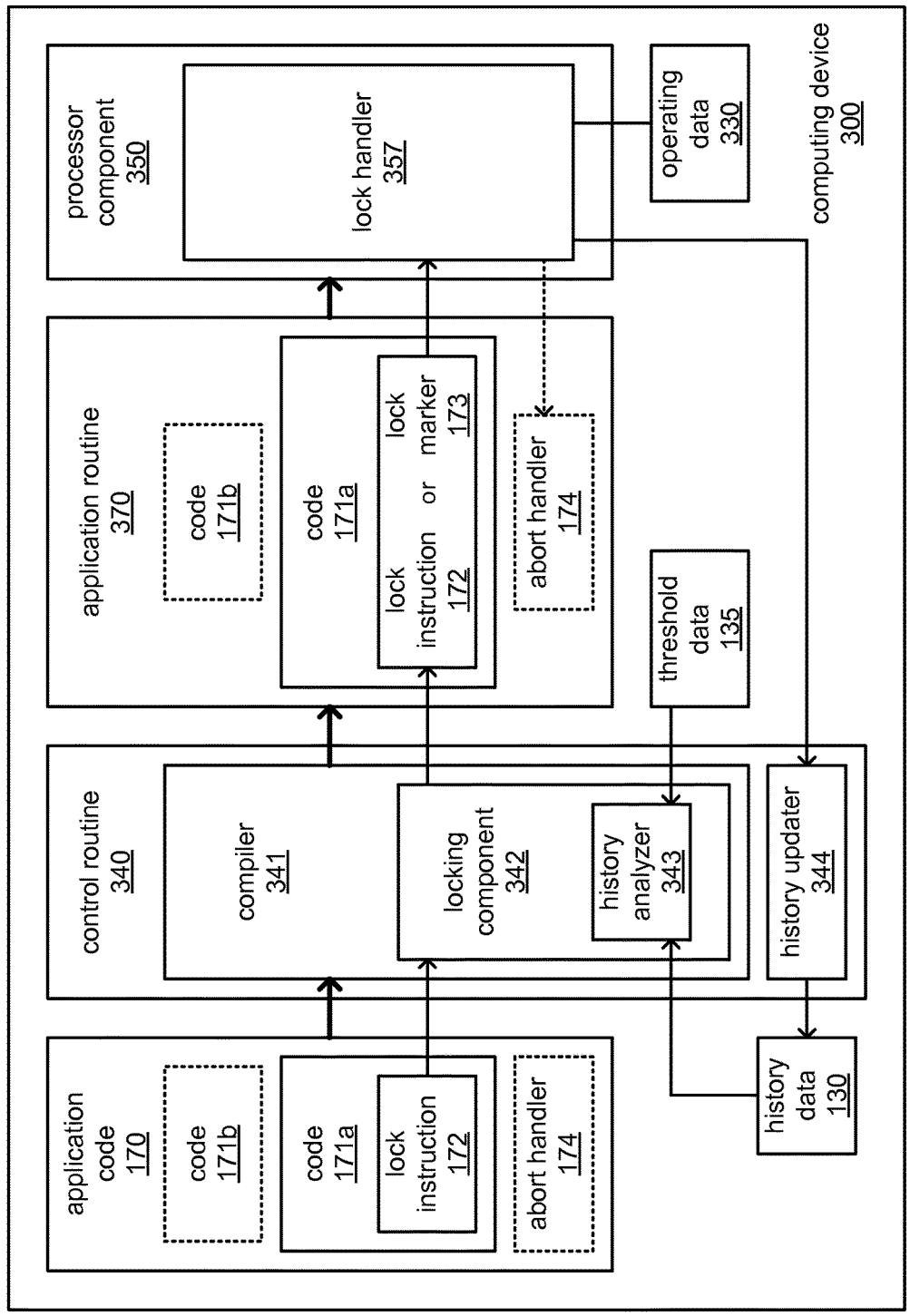
FIG. 2 illustrates a portion of an embodiment.

FIG. 2 illustrates a block diagram of a portion of an embodiment of the processing system 1000 of FIG. 1 in greater detail, specifically the computing device 300. As appreciable by those skilled in the art, the control routine 340 and the application routine 370 (as compiled from the application code 170), including the components of which each is composed, are selected to be operative on whatever type of processor or processors that are selected to implement the processor component 350.

In various embodiments, each of the control routine 340 and the application routine 370 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 350. Where one or more device drivers are included, those device drivers may provide support for any of a variety of other components, whether hardware or software components, of the computing device 300.

As specifically depicted as an example, the application code incorporates portions of code, specifically one or more of the code 171*a* that includes a lock instruction 172, the code 171*b* and an abort handler 174. The code 171*a* and 171*b* are each made up of a sequence of instructions to perform any of a variety of functions. As will shortly be explained, the lock instruction 172 specifies the operating data 330 as a resource to which access is to be locked in order to limit access to the instructions of an instance of the code 171*a*. As will also shortly be explained, the abort handler 174 (if present) is made up of instructions that may be executed to reverse at least some effects of the development of contention over a resource (e.g., the operating data 330). Such reversal of such effects may entail aborting execution of one or more instances of the code 171a and/or the code 171b. As has been explained, the application code 170 is made up of instructions in a form requiring compiling to be made executable by the processor component 350. Again, the instructions of the application code 170 may be in human-readable or machine-readable form.

The control routine 340 includes a compiler 341 executable by the processor component 350 to compile the application code 170 to generate the application routine 370. The compiler 341 incorporates a locking component 342 to perform compilation related to lock instructions, such as the lock instruction 172 of the code 171a. In turn, the locking component 342 incorporates a history analyzer 343 to determine whether to the lock instruction 172 should be replaced with a lock marker 173 by the locking component 342 during compiling.

The application routine 370, upon being generated from the application code 170 as depicted, includes one or more of the code 171a, the code 171b and the abort handler 174 in compiled form. Upon being compiled, the code 171a either includes the lock instruction 172 in compiled form, or includes the lock marker 173 replacing the lock instruction 172, depending on what the history analyzer 343 signals the locking component 342 to do. The lock instruction 172 of the code 171a requests that access to the operating data 330 be locked to an instance of the code 171a being executed in a thread by the processor component 350 to prevent access to the operating data 330 by another instance of code, such as either another instance of the code 171a or an instance of the code 171b. In contrast, the lock marker 173 provides an indication of the presence of the lock instruction 172 in the code 171a prior to compiling by the compiler 341 and an indication of its request to lock access to the operating data 330, but the lock marker 173 does not itself request that access to the operating data 330 be locked.

It should be noted, and as will be familiar to those skilled in the art, the lock instruction 172 may be accompanied by a release instruction (not shown) to explicitly release the lock requested by the lock instruction 172. Thus, the lock instruction 172 requests a lock on a resource (e.g., the operating data 330) for the duration of execution of an instance of code made up of instructions (sometimes referred to as "critical" section of code that implements a "transaction") between the lock instruction 172 and its accompanying release instruction. On occasions where the lock instruction 172 is replaced with the lock marker 173, such a release instruction may be replaced with a release marker (not shown), that indicates the position of the replaced release instruction, and thereby may further serve to indicate the end of the "critical" section of code between the lock marker 173 and its accompanying release marker. Should an aborting of execution of an instance of code that includes the lock marker 173 be determined to be necessary in response to an occasion of contention over a resource (e.g., the operating data 330), the presence of both the lock marker 173 and its accompanying release marker may provide an indication of what instructions are involved in the aborting of execution.

Figure 3A:
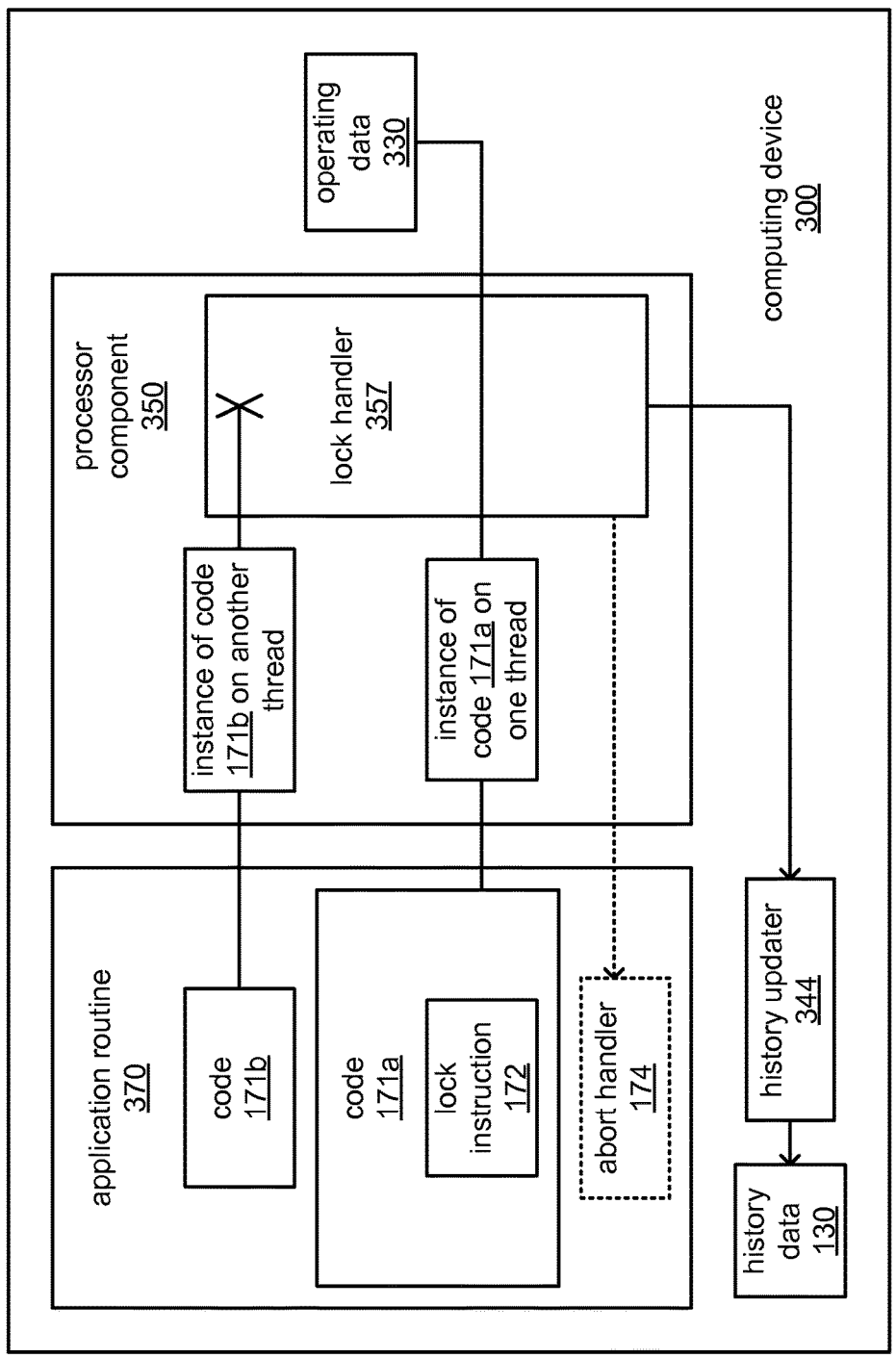
FIGS. 3*a-b* and 4*a-b* each illustrate embodiments of control of use of locks.
Figure 3B:
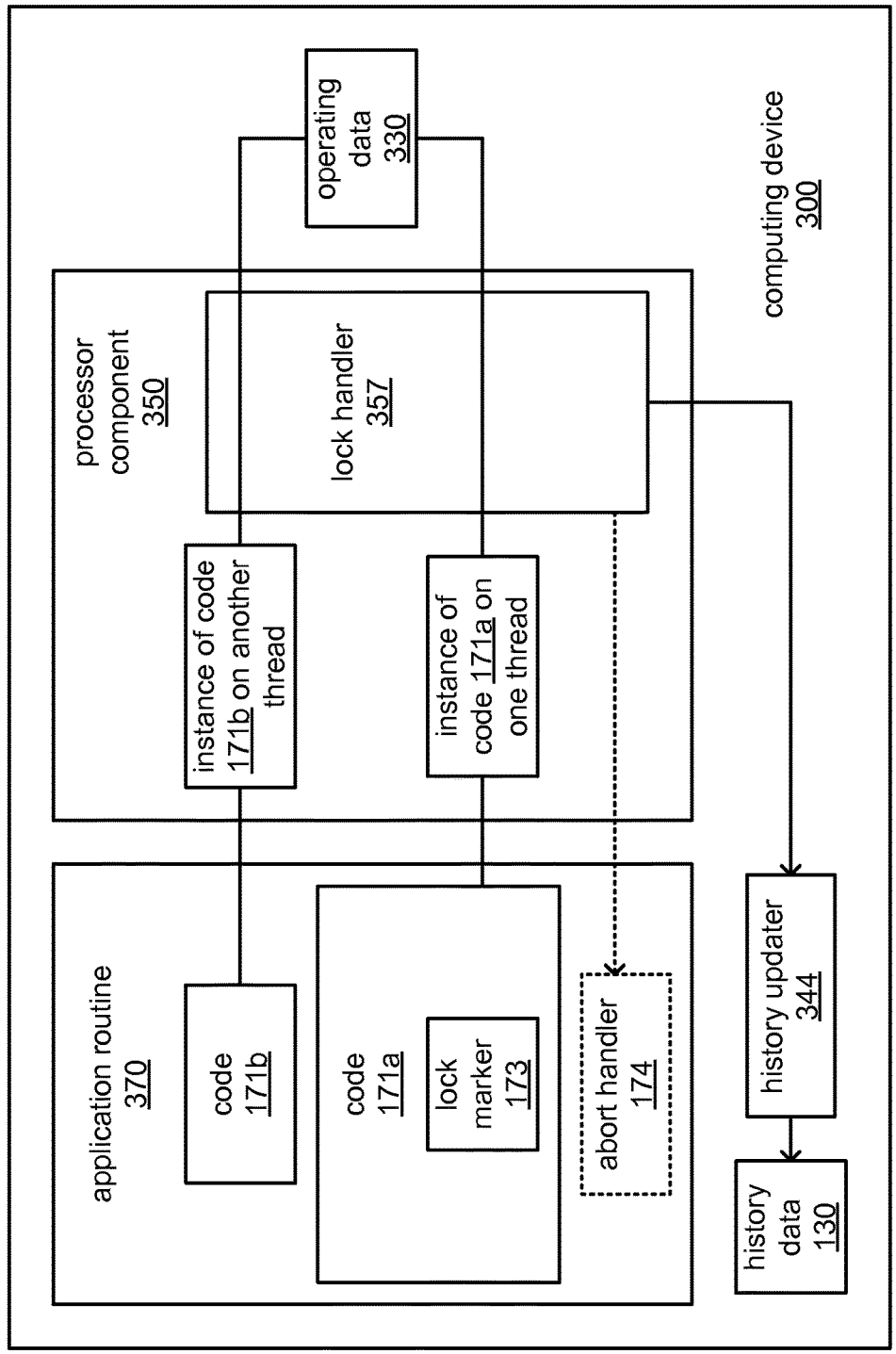

FIGS. 3a and 3b illustrate examples of contrasting results of the code 171a in compiled form within the application routine 370 including the lock instruction 172 versus the lock marker 173 according to an embodiment. Turning to FIG. 3a, the application code 170 is compiled by the compiler 341 such that the code 171a within the application routine 370 includes the lock instruction 172 in compiled form. During execution of an instance of the code 171a by the processor component 350 on one thread, the lock handler 357 of the processor component 350 locks access to the operating data 330 to that instance of the code 171a on that thread in response to the lock instruction 172. As a result, attempts to access the operating data 330 by instructions of an instance of the code 171b concurrently executed by the processor component 350 on another thread are prevented until the code 171a completes its accesses to the operating data 330 and the lock is released.

Due to the imposition of the requested locking of access to the operating data 330, the possibility of contention over access to the operating data 330 between the instance of the code 171a and the instance of the code 171b is precluded. However, this comes at the cost of forcing execution of the instance of the code 171b to be forestalled until that lock is released by the instance of the code 171a, thereby temporarily losing the ability to continue executing these two instances of code concurrently.

Turning to FIG. 3b, in contrast to FIG. 3a, the application code 170 is compiled by the compiler 341 such that the code 171a within the application routine 370 includes the lock marker 173 substituted for the lock instruction 172. During execution of an instance of the code 171a by the processor component 350 on one thread, the lock marker 173 provides an indication to the lock handler 357 of the request of the replaced lock instruction 172 to lock access to the operating data 330 to that instance of the code 171a executed on that thread. This provides notice to the lock handler 357 of the possibility that an instance of contention over the operating data 330 may develop between that instance of the code 171a and another instance of code. However, as has also been explained, the lock marker 173 does not actually convey an instruction to lock access to the operating data 330 to that instance of the code 171a such that other code cannot have access to the operating data 330. As a result, attempts to access the operating data 330 by instructions of an instance of the code 171b concurrently executed by the processor component 350 on another thread are speculatively allowed to proceed.

Due to the allowance of such speculative execution, the instructions of the instance of the code 171a executed on the one thread and the instructions of the instance of the code 171b on the other thread continue to be executed concurrently, thereby allowing the operating data 330 to be shared by both. However, this comes with the risk that contention over access to the operating data 330 may develop such that execution of one or both of the instances of the code 171a and 171b must be aborted, at least back to the point at which the lock marker 173 was encountered during execution of the instance of the code 171a. As appreciable to those skilled in the art, there is a risk that the gains in performance achieved by allowing speculative execution of the instance of the code 171b concurrently with execution of the instance of the code 171a may be more than negated by the loss of time that can result from having to abort execution of one or both.

Figure 4A:
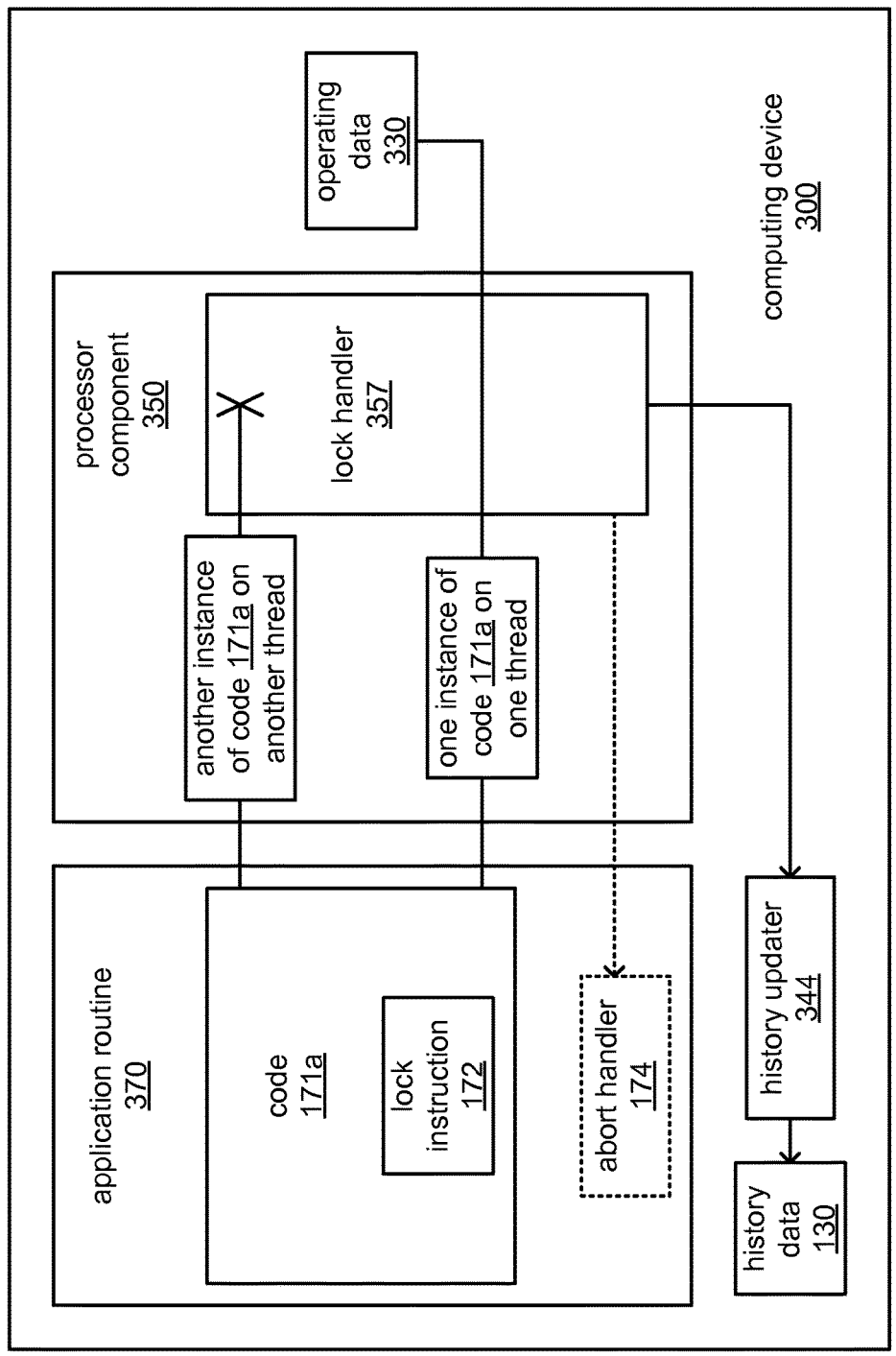
Figure 4B:
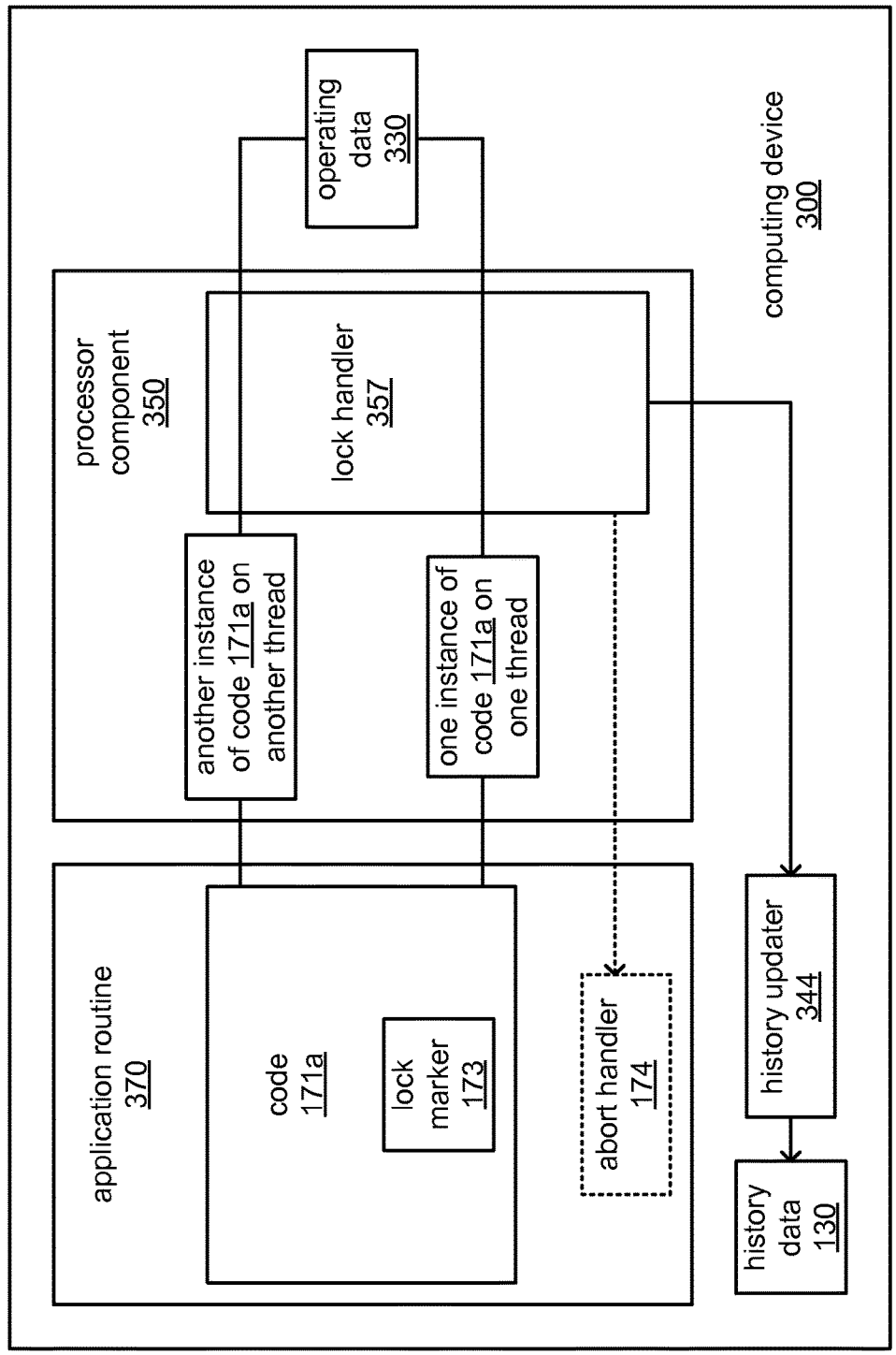

FIGS. 4a and 4b also illustrate examples of contrasting results of the code 171a in compiled form within the application routine 370 including the lock instruction 172 versus the lock marker 173 according to an embodiment. What is illustrated in FIGS. 4a and 4b is substantially analogous to what is illustrated in FIGS. 3a and 3b, except that FIGS. 4a and 4b illustrate the results where the possibility of contention of access to the operating data 330 is between two concurrently instances of the same code, specifically the code 171a.

Turning to FIG. 4a, the application code 170 is compiled by the compiler 341 such that the code 171a within the application routine 370 includes the lock instruction 172 in compiled form. During execution of one instance of the code 171a by the processor component 350 on one thread, the lock handler 357 of the processor component 350 locks access to the operating data 330 to that instance of the code 171a on that thread in response to the lock instruction 172. As a result, attempts to access the operating data 330 by instructions of another instance of the code 171a concurrently executed by the processor component 350 on another thread are prevented until the one instance of the code 171a completes its accesses to the operating data 330 and the lock is released. Again, the possibility of contention is precluded by the imposition of locking of access to the operating data 330. However, this comes at the cost of temporarily losing the ability to concurrently execute both instances of the code 171a.

Turning to FIG. 4b, the application code 170 is compiled by the compiler 341 such that the code 171a within the application routine 370 includes the lock marker 173 substituted for the lock instruction 172. During execution of one instance of the code 171a by the processor component 350 on one thread, the lock marker 173 provides an indication to the lock handler 357 of the request of the replaced lock instruction 172 to lock access to the operating data 330 to that instance of the code 171a executed on that thread, but doesn't actually convey an instruction to perform that lock. As a result, attempts to access the operating data 330 by instructions of another instance of the code 171a concurrently executed by the processor component 350 on another thread are speculatively allowed to proceed. Again, the allowance of speculative execution enables concurrent execution to proceed. However, this comes with the risk that contention over access to the operating data 330 may develop such that execution of one or both of the instances of the code 171a must be aborted, at least back to the point at which the lock marker 173 was encountered during execution of the one instance of the code 171a.

Returning to FIG. 2, to enable realization of the benefits of allowing such speculative execution while minimizing the risks of instances of contention leading to aborting of execution, the history analyzer 343 retrieves indications from the history data 130 of past results of replacing the lock instruction 172 with the lock marker 173 in determining whether the lock instruction 172 should again be replaced with the lock marker 173 as the application code 170 is again compiled. In some embodiments, any indication of a past occurrence of contention having arisen as a result of allowing such speculative execution may lead to a determination to not replace the lock instruction 172 with the lock marker 173 such that the lock instruction 172 is present in the code 171a as compiled to make its request for access to the operating data 330 to be locked.

In other embodiments, a threshold ratio of the number of times speculative execution was allowed versus the number of times that contention over a resource was or was not the result may be used to determine whether to replace the lock instruction 172 with the lock marker 173 during compilation to allow sharing of a resource between an instance of the code 171a and another instance of code that is speculatively executed, whether that other instance is of the code 171a or of other code. In such other embodiments, if a maximum ratio of instances of contention resulting versus the number of times speculative execution was attempted is exceeded, then such replacement of the lock instruction 172 is not performed. Alternatively, if a minimum ratio of the number of times speculative execution did not result in contention versus the number of time speculative execution was attempted is not met, then such replacement of the lock instruction 172 is not performed. One or the other of such a threshold may be retrieved by the history analyzer 343 from the threshold data 135.

The history analyzer 343 may also retrieve an indication from the threshold data 135 of an interval of time to allow to pass since speculative execution was last allowed and resulted in contention before again attempting to allow speculative execution to test whether conditions have changed such that contention is no longer the result. It may be deemed desirable to select such a time interval to cause such periodic testing for a change in conditions to see if the benefits of allowing concurrent execution of multiple instances of code and the resultant sharing of the same resource can be realized. Conditions that may lead to such speculative execution becoming possible at some later time include, and are not limited to, a change in version of the application code 170 and/or the control routine 340, a change in a component of the computing device 300, a change in operating conditions of the network 999 resulting in a change in a rate of throughput, a change in the remote computing device 500 such the manner in which it interacts with the computing device 300 changes, a change in a resource sought to be locked, etc.

The control routine 340 also includes a history updater 344 executable by the processor component 350 to update the history data 130 with the results of new attempts to allow the operating data 330 to be shared in spite of the lock requested in the lock instruction 172 by allowing speculative execution of another portion. In some embodiments, the history data 130 may be updated only where such speculative execution was allowed and resulted in an instance of contention. In other embodiments, the history data 130 may be updated only where such speculative execution was allowed and was successful such that it resulted in no instances of contention.

In some embodiments, where the history data 130 does not exist (e.g., the application code 170 has not yet been run or the history data 130 has been lost, deleted, etc.), the history updater 344 may create the history data 130. Further, where the history data 130 does not yet exist or does not yet include an indication of a result of replacing the lock instruction 172 with the lock marker 173 (e.g., the history data 130 has been cleared), then the history analyzer 343 may signal the locking component 342 to default to replacing the lock instruction 172 with the lock marker 173 to make an attempt to share the operating data 330 by attempting allowance of speculative execution. In this way, the history data 130 and/or indications within the history data 130 concerning the results of replacing the lock instruction 172 with the lock marker 173 may be created, thereby enabling such results to be learned and used as an input to subsequent determinations of whether or not to effect such a replacement.

It should be noted that while it is envisioned that the application code 170 may be compiled each time it is executed, it is not envisioned that such repeated compilations occur each time execution of an instance of the code 171a by the processor component 350 occurs. However, in some embodiments, where replacement of the lock instruction 172 with the lock marker 173 to allow speculative execution results in repeated instance of contention at a rate deemed to be unacceptable when compared to a threshold retrieved from the threshold data 135, the history analyzer 343 may trigger a momentary stoppage of execution of the application routine 370 to allow a recompiling of the application code 170 to undo replacement of the lock instruction 172 with the lock marker 173. As a result, the code 171a in its recompiled form in the resulting recompiled version of the application routine 370 includes the lock instruction 172 in compiled form such that instances of the code 171a executed by the processor component 350, from then on, present the lock instruction to the lock handler 357, and further instances of contention are avoided. There can be rare occasions in which instances of the code 171a that are already being executed will present the lock marker 173 to the lock handler 357 while other instances of the code 171a that are executed following a recompiling of the application routine 170 will present the lock instruction 172 to the lock handler 357. However, on such rare occasions, it is envisioned that once those instances already being executed have completed execution, all subsequent instances of the code 171a being executed will conform to the code 171a as recompiled with the lock instruction 172, versus the lock marker 173. Correspondingly, in other embodiments, such a momentary stoppage of execution and recompiling may be triggered as a result of an interval of time having elapsed since the last occasion on which allowance of speculative execution was attempted. During such a stoppage in such other embodiments, the application code 170 may be recompiled to replace the lock instruction 172 with the lock marker 173 as part of testing whether conditions have changed such that speculative execution may be possible without causing contention.

Figure 5:
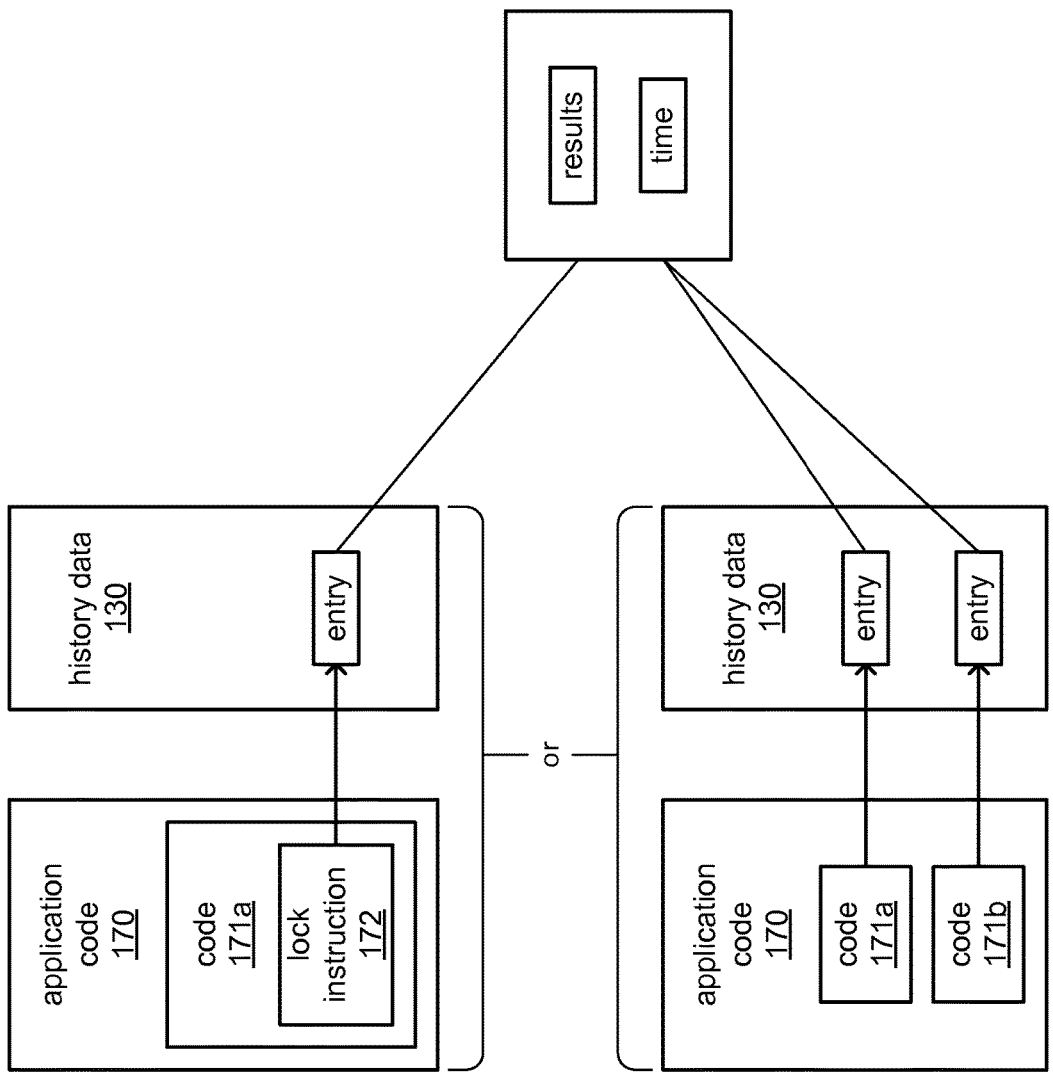
FIG. 5 illustrates an organization of history data according to an embodiment.

FIG. 5 illustrates two examples of organization of data within the history data 130 in accordance with an embodiment. As specifically depicted, entries that include at least an indication of results of allowing speculative execution in spite of lock instruction(s) requesting resource access locking may be maintained with a per lock instruction granularity or a granularity of per portion of code (e.g., per callable function, per named procedure, etc.) in the history data 130. Further, each such entry, whether per lock instruction or per portion, may include a separate indication of an amount of time that has passed since the last attempt was made to allow sharing of a resource by allowing speculative execution to enable sharing that resource in spite of a lock instruction. That amount of time may indicate an amount of time since such speculative execution was last allowed without regard to the result, or may indicate an amount of time since such speculative execution was last allowed that resulted in an instance of contention over that resource.

Figure 6:
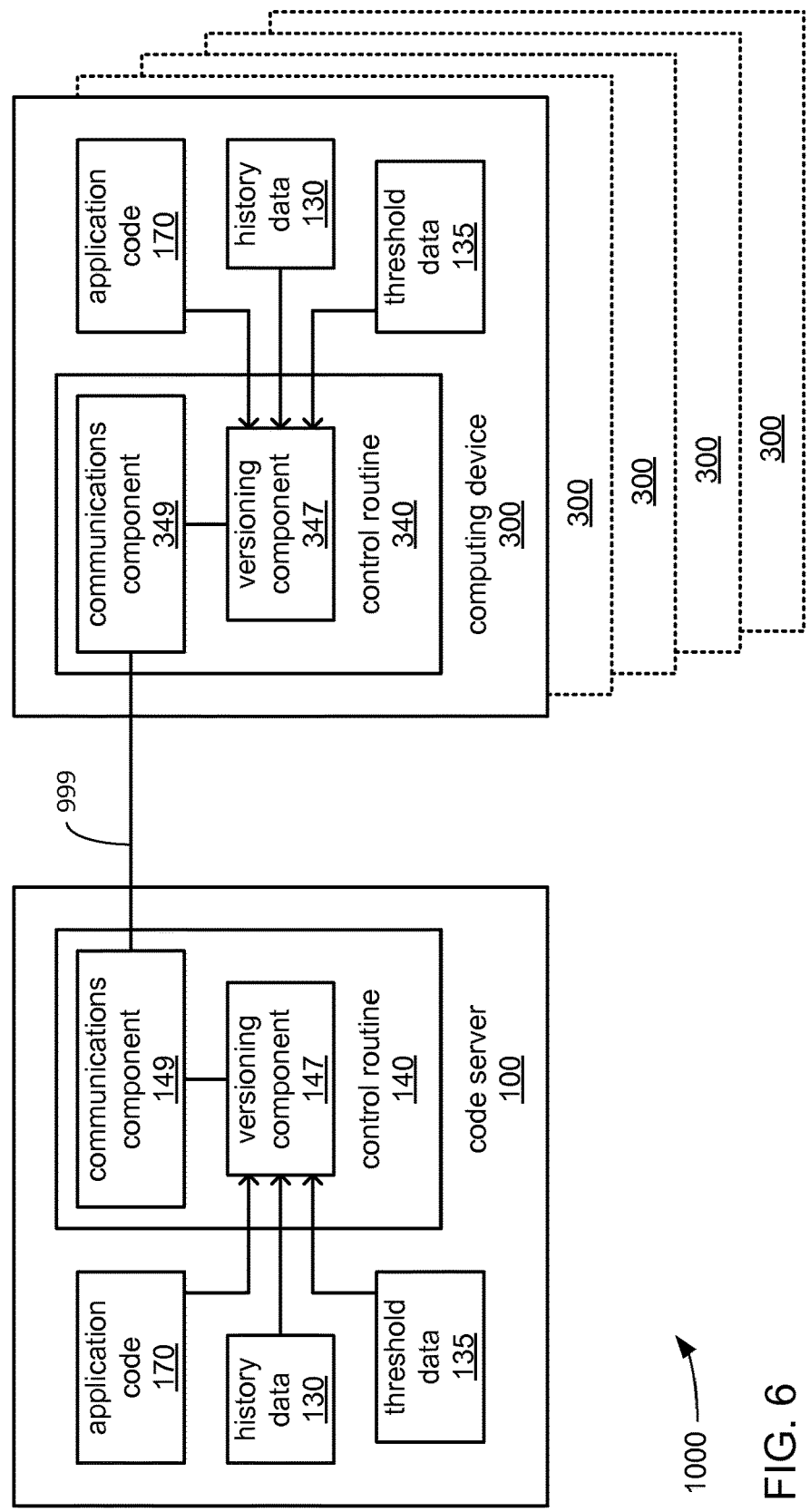
FIG. 6 illustrates a portion of an embodiment.

FIG. 6 illustrates a block diagram of a portion of an embodiment of the processing system 1000 of FIG. 1 in greater detail, specifically the code server 100 and the computing device 300. As appreciable by those skilled in the art, the control routines 140 and 340, including the components of which each is composed, are selected to be operative on whatever type of processor or processors that are selected to implement corresponding ones of the processor components 150 and 350. More specifically, FIG. 6 depicts an example of selective transfers of one or more of the application code 170, the history data 130 and the threshold data 135 from the code server 100 to the computing device 300 in response to a re-initialization of the computing device 300 and/or in response to the versions of one or more them stored in the storage 160 being newer than the one or more of them stored in the storage 360.

In various embodiments, the control routine 140 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 150. Where one or more device drivers are included, those device drivers may provide support for any of a variety of other components, whether hardware or software components, of the computing device 100.

The control routines 140 and 340 include a communications component 149 and 349, respectively, executable by corresponding ones of the processor components 150 and 350 to operate the interfaces 190 and 390 to transmit and receive signals via the network 999 as has been described. Among the signals received may be signals conveying one or more of the application code 170, the history data 130 and the threshold data 135 via the network 999. As will be recognized by those skilled in the art, each of these communications components is selected to be operable with whatever type of interface technology is selected to implement corresponding ones of the interfaces 190 and 190.

The control routines 140 and 340 also include versioning components 147 and 347, respectively, executable by corresponding ones of the processor components 150 and 350 to compare versions of one or more of the application code 170, the history data 130 and the threshold data 135 stored within each of the computing devices 100 and 300. Such comparisons may be triggered on a recurring basis in which one of the versioning components 147 and 347 may signal the other to begin such a comparison following the elapsing of a recurring interval of time. Alternatively, such comparisons may be triggered on an event-driven basis such as by one of the versioning components 147 and 347 signaling the other to begin such a comparison in response to an update of the version(s) of one or more of the application code 170, the history data 130 and the threshold data 135.

More specifically, given that the history data 130 is necessarily associated with the application code 170, an instance of an update to the application code 170 to a newer version may render the indications of past results of speculative execution in an existing version of the history data 130 inapplicable to the application code 170. This may especially be true where changes are made to the number and/or location of lock instructions within the application code 170. Thus, an update of the application code 170 may necessitate a corresponding update of the history data 130, and thus the versioning components 147 and 347 may cooperate to ensure that both are updated together.

As also depicted in FIG. 6, and as previously discussed, the computing device 300 may be one of multiple computing devices employed together to perform a collective function such as providing services to remotely located computing devices via the network 999. In such embodiments, the versioning component 147 of the code server 100 may cooperate with the versioning component 347 of each of the multiple ones of the computing device 300 to maintain updated versions across all of the computing devices 300. Further, updates of the separate ones of the history data 130 with the results of more recent attempts at allowing speculative execution may be transmitted back to the code server 100 to enable updating of its copy of the history data 130, as well as the sharing of those updates with others of the multiple computing devices 300.

Figure 7:
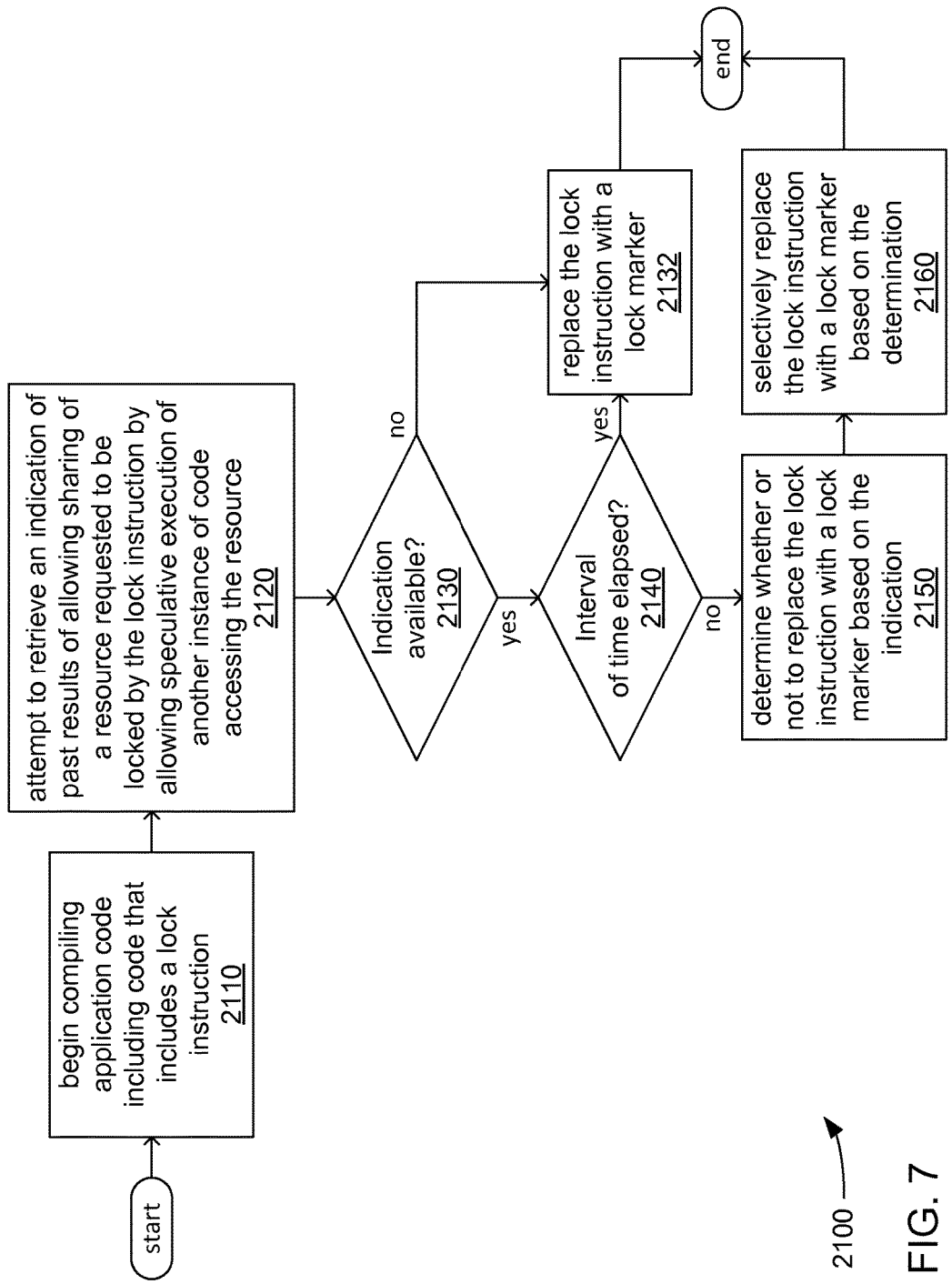
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the control routine 340, and/or performed by other component(s) of the computing device 300.

At 2110, a processor component of a computing device (e.g., the processor component 350 of the computing device 300) begins compiling an application code (e.g., the application code 170) to generate an application routine (e.g., the application routine 370). The application code includes code that includes a lock instruction (e.g., the code 171a that includes the lock instruction 172). As has been discussed, the application code may be compiled each time it is to be executed by the computing device.

At 2120, an attempt is made to retrieve an indication of past results of allowing sharing of a resource requested to be locked by the lock instruction. The indication is of whether allowing speculative execution of another instance of code (e.g., either an other instance of the code 171a or an instance of the code 171b) that accesses the same resource (e.g., the operating data 330) resulted in contention between those instances of code over access to that resource. As has been discussed, such an indication of such results may be stored in a history data (e.g., the history data 130) that is updated with indications of results of recent attempts at allowing sharing of a resource by allowing such speculative execution in spite of the lock instruction.

If, at 2130, the attempted retrieval of such an indication was not successful (e.g., the history data was not available or did not include such an indication), then the lock instruction is replaced with a lock marker at 2132. As has been discussed, such replacement of the lock instruction may be carried out as a default action in response to a non-existent or unavailable indication of a past result of doing so in order to attempt speculative execution to discover whether contention is the result.

However, if such an attempted retrieval is successful at 2130, then a check is made at 2140 as to whether a specified interval of time has elapsed since the last occasion where the lock instruction was replaced with the lock marker. If that interval of time has elapsed, then such replacement of the lock instruction with the lock marker is performed at 2132. As has been discussed, it may be that conditions have changed over time such that a replacement of a lock instruction with a lock marker that earlier resulted in contention over a resource may not currently still result in such contention. Thus, it may be deemed desirable after passage of the specified interval of time to test whether such contention is still the result.

However, if such a specified interval of time has not elapsed at 2140, then a determination is made at 2150 as to whether or not to replace the lock instruction with a lock marker based on the retrieved indication of past results. As has been discussed, the indication may be a percentage, proportion, ratio or other fractional expression of a number of times that such speculative execution has been allowed versus either a number of times that contention resulted or a number of times that contention did not result. In such embodiments, such an expression may be compared to a selected threshold to determine whether or not to replace the lock instruction in a new compiling of the application code. Alternatively, as has also been discussed, the indication may be as to whether an instance of contention occurred the last time such speculative execution was allowed. At 2160, the lock instruction is selectively replaced with a lock marker based on the determination.

Figure 8:
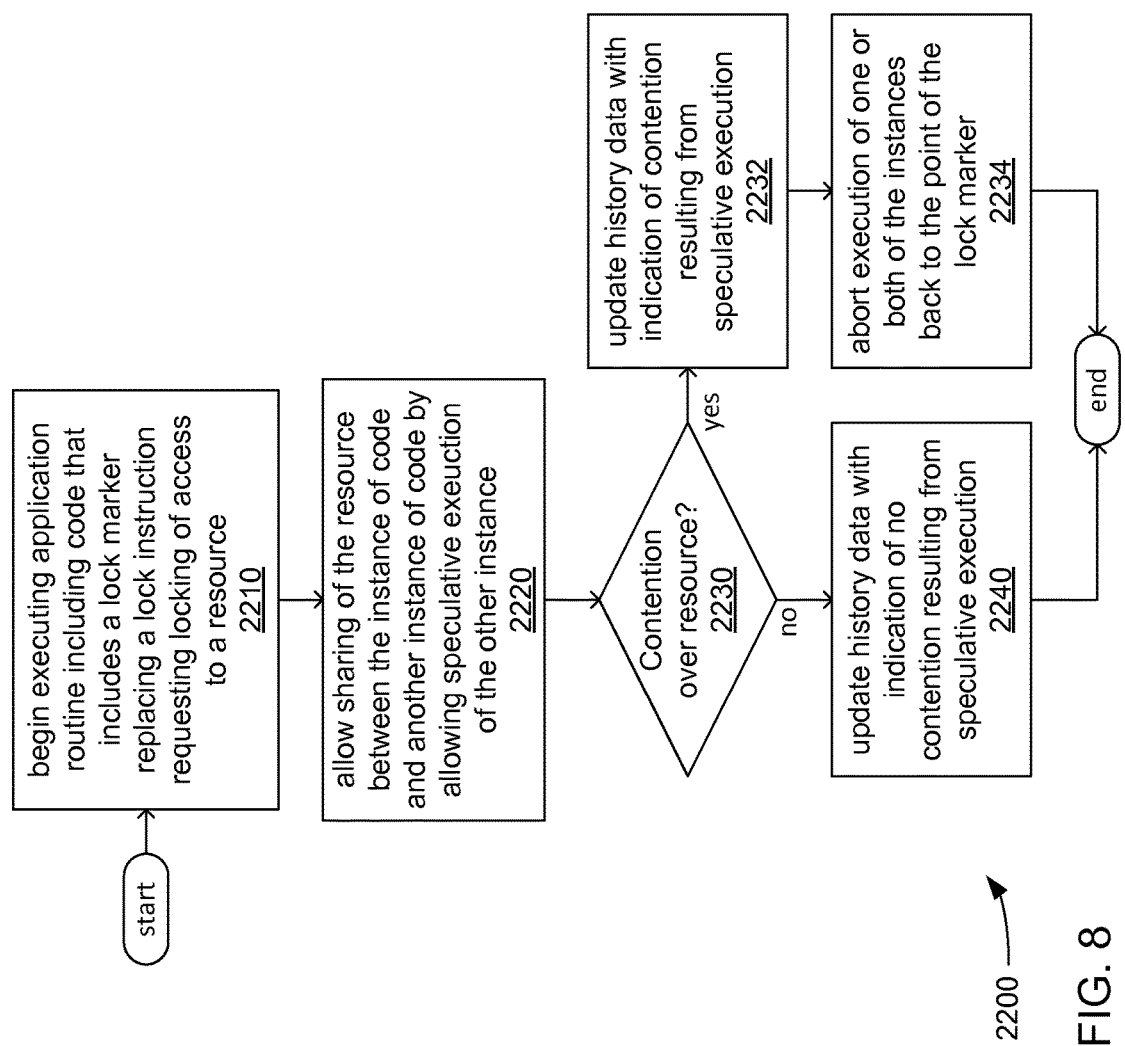

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 350 in executing at least the control routine 340, and/or performed by other component(s) of the computing device 300.

At 2210, a processor component of a computing device (e.g., the processor component 350 of the computing device 300) begins executing an application routine (e.g., the application routine 370) that includes code that includes a lock marker that replaces a lock instruction requesting the locking of access to a resource (e.g., the portion 171a in compiled form that includes the lock marker 173 that replaces the lock instruction 172 that requests access to the operating data 330 to be locked). As has been discussed, the application routine may be generated by compiling the application code each time the application routine is to be executed by the computing device.

At 2220, sharing of the resource is allowed in response to the replacement of the lock instruction with the lock marker by allowing execution of an instance of the code that includes the lock marker to concurrently occur with speculative execution of another instance of code (e.g., another instance of the same code or an instance of different code). As has been discussed, the lock marker indicates to a lock handler of the processor component that there was a lock instruction that requested the locking of access to the resource, and indicates tot he lock handler the location of where that lock instruction was in the code prior to compiling.

At 2230, if both instances of code are concurrently executed with no resulting contention over access to the resource, then a history data is updated with an indication to the effect that speculative execution was allowed in spite of the lock instruction and that no such instance of contention resulted at 2240. However, if such an instance of contention did result at 2230, then the history data is updated with an indication to the effect that the speculative execution did result in such an instance of contention at 2232, and execution of one or both of the instances of code are aborted back to the point of the lock marker at 2234.

Figure 9:
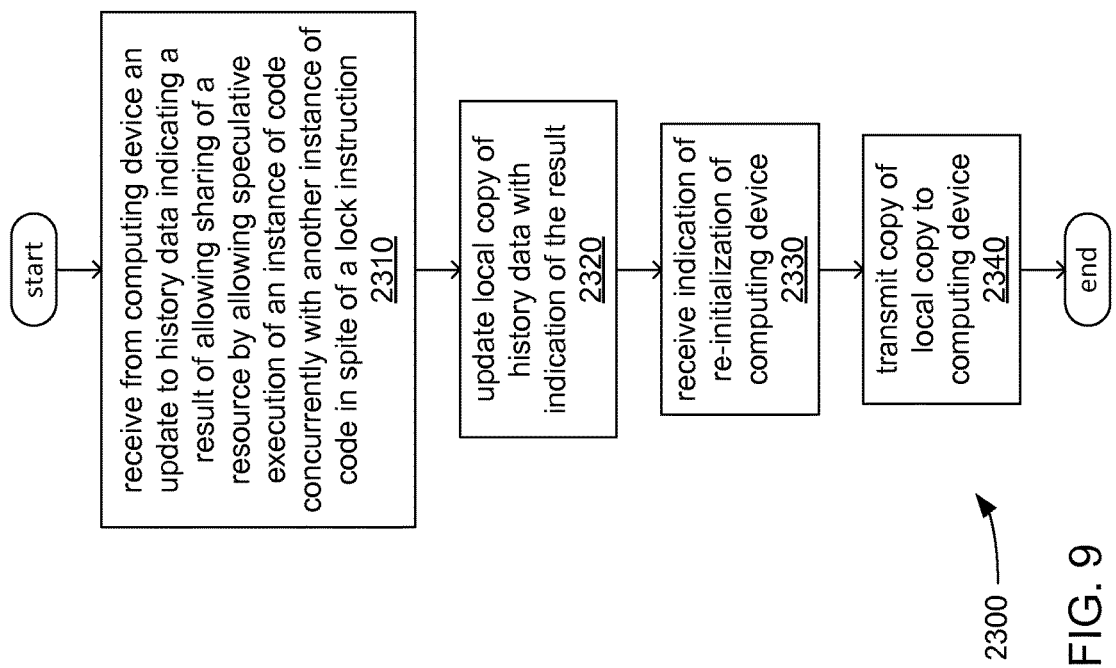

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 150 in executing at least the control routine 140, and/or performed by other component(s) of the code server 100.

At 2310, a processor component of a code server (e.g., the processor component 150 of the code server 100) receives from a computing device (e.g., the computing device 300) an indication of an update to history data of results of allowing sharing of a resource to which access was sought to be locked by a lock instruction of one instance of code by allowing speculative execution of another instance of code (e.g., another instance of the same code or an instance of different code) that accesses the resource. At 2320, the local copy of the history data maintained by the code server is updated with the indication of the results. As has been explained, updates to a history data stored in the computing device may be transmitted to the code server.

At 2330, the code server receives an indication of the computing device being re-initialized. As has been explained, it may be that the computing device is one of many computing devices used together to provide services to operators of remotely located computing devices (e.g., the remote computing device 500). At 2340, in response to the indication of re-initialization, the code server transmits a copy of its local copy of the history data to the computing device to enable the computing device to avoid having to recreate a new history data by attempting allowance of such speculative execution.

Figure 10:
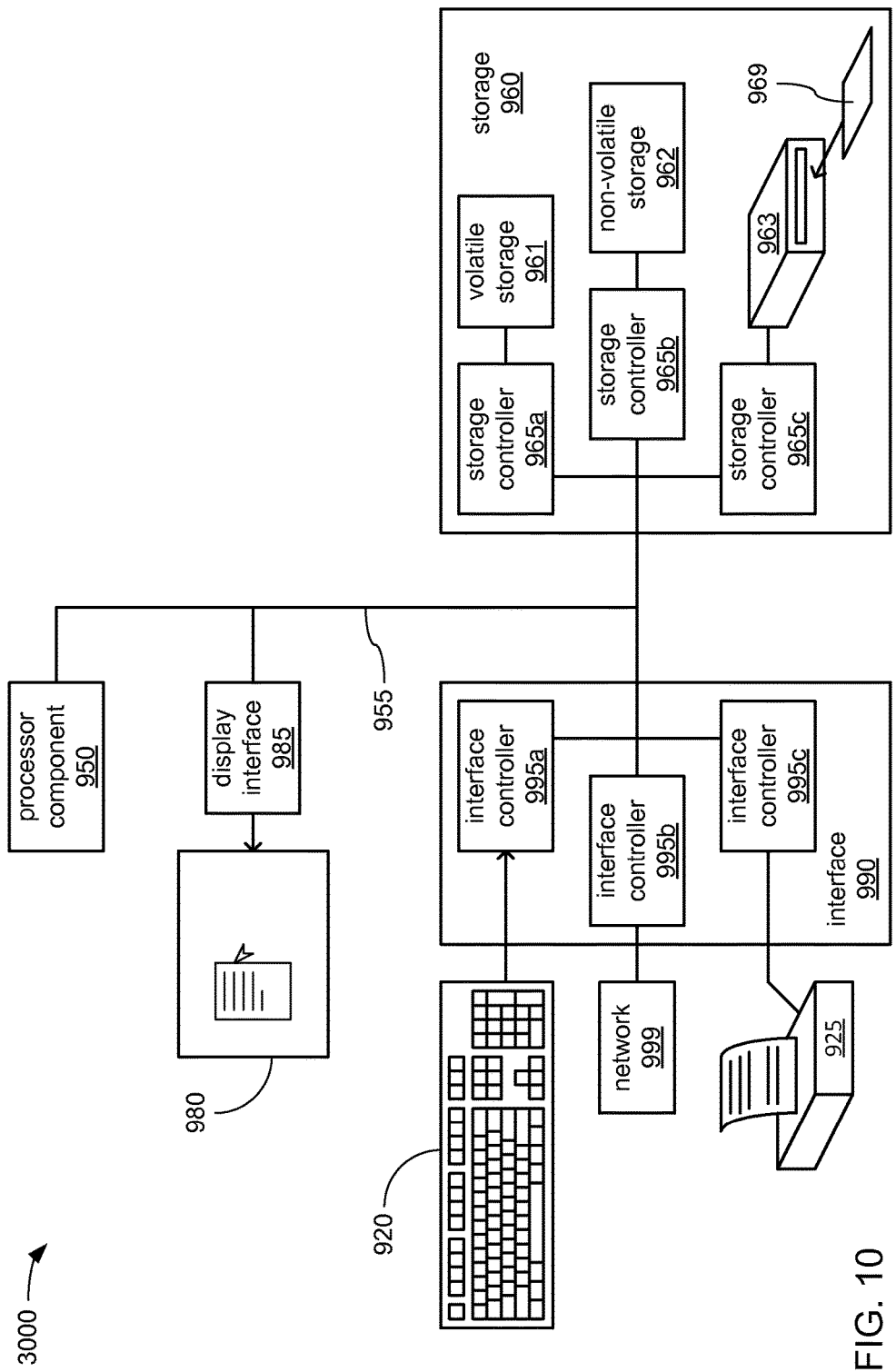
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 100, 300 or 500. It should be noted that components of the processing architecture 3000 are given reference numbers in which the last two digits correspond to the last two digits of reference numbers of at least some of the components earlier depicted and described as part of the computing devices 100, 300 and 500. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 150, 350 and 550) may include any of a wide variety of commercially available processors, employing any of a wide variety of technologies and implemented with one or more cores physically combined in any of a number of ways.

As previously discussed, the storage 960 (corresponding to the storages 160, 360 and 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 380 or 680), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to control locking of a resource includes a processor component, a history analyzer for execution by the processor component to analyze at least one result of a replacement of a lock instruction of a first instance of code with a lock marker to allow the processor component to speculatively execute a second instance of code, and a locking component for execution by the processor component to replace the lock instruction with the lock marker based on analysis of the at least one result, the first and second instances of code to access a resource and the lock instruction to request a lock of access to the resource to the first instance of code.

The above example of an apparatus in which the history analyzer is to retrieve an indication of the result from a history data.

Either of the above examples of an apparatus in which the processor component includes a lock handler to speculatively execute the second instance of code concurrently with execution of the first instance of code in response to replacement of the lock instruction with the lock marker, and to monitor execution of the first and second instances of code for contention over access to the resource.

Any of the above examples of an apparatus in which the lock handler is to abort execution of at least one of the first and second instances of code in response to an occurrence of contention.

Any of the above examples of an apparatus in which the lock handler is to execute an abort handler of an application code in response to an occurrence of contention.

Any of the above examples of an apparatus in which the apparatus includes a history updater for execution by the processor component to update the history data with an indication of whether contention occurs.

Any of the above examples of an apparatus in which the locking component is to replace the lock instruction with the lock marker in response to an elapse of a selected interval of time since a last occurrence of replacement of the lock instruction with the lock marker in which contention resulted.

Any of the above examples of an apparatus in which the apparatus includes an interface to receive the history data from a code server via a network following loss of the history data due to a re-initialization, and to transmit an update to the history data to the code server via the network.

Any of the above examples of an apparatus in which the apparatus includes a compiler for execution by the processor component to compile an application code into an application routine comprising code of the first and second instances of code, the history analyzer to selectively replace the lock instruction with the lock marker in the first instance of code.

Any of the above examples of an apparatus in which the compiler is to compile the application code into the application routine each time the application routine is to be executed by the processor component.

Any of the above examples of an apparatus in which the first and second instances of code include a common portion of code of the application code.

Any of the above examples of an apparatus in which the first and second instances of code include different portions of code of the application code.

An example of another apparatus to control locking of a resource includes a processor component, a compiler for execution by the processor component to compile an application code to generate an application routine, and a locking component for execution by the processor component to selectively replace a lock instruction of the application code with a lock marker in the application routine, the lock instruction to request a lock of access to a resource and the lock marker to not request a lock of access to the resource.

The above example of another apparatus in which the apparatus includes a history analyzer for execution by the processor component to retrieve an indication of at least one result of an earlier replacement of the lock instruction with the lock marker from a history data and to analyze the at least one result, the locking component to selectively replace the lock instruction with the lock marker based on analysis of the at least one result.

Either of the above examples of another apparatus in which the apparatus includes a history updater for execution by the processor component to update the history data with an indication of whether contention over access to the resource occurs in response to replacement of the lock instruction with the lock marker.

Any of the above examples of another apparatus in which the apparatus includes an interface to transmit an indication of an update to the history data by the history updater to a code server.

Any of the above examples of another apparatus in which the apparatus includes a versioning component for execution by the processor component to signal the code server to provide a newer version of the history data in response to receipt of a newer version of the application code.

Any of the above examples of another apparatus in which the history analyzer is to retrieve an indication of an interval of time and to replace the lock instruction with the lock marker in response to the interval of time having elapsed since a last occurrence of replacement of the lock instruction with the lock marker in which contention over access to the resource resulted.

Any of the above examples of another apparatus in which the compiler is to compile the application code into the application routine each time the application routine is to be executed by the processor component.

An example of a computer-implemented method for controlling locking of a resource includes retrieving a stored history data indicating at least one result of a replacement of a lock instruction of a first instance of code with a lock marker, analyzing the at least one result, and replacing the lock instruction with the lock marker based on analysis of the at least one result to allow a processor component to speculatively execute a second instance of code, the first and second instances of code to access a resource and the lock instruction to request a lock of access to the resource to the first instance of code.

The above example of a computer-implemented method in which the method includes speculatively executing the second instance of code concurrently with executing the first instance of code based on replacement of the lock instruction with the lock marker, and monitoring execution of the first and second instances of code for contention over access to the resource.

Either of the above examples of a computer-implemented method in which the method includes aborting execution of at least one of the first and second instances of code based on an occurrence of contention.

Any of the above examples of a computer-implemented method in which the method includes updating the history data with an indication of whether contention occurs.

Any of the above examples of a computer-implemented method in which the method includes replacing the lock instruction with the lock marker in response to a selected interval of time elapsing since a last occurrence of replacement of the lock instruction with the lock marker in which contention resulted.

Any of the above examples of a computer-implemented method in which the method includes compiling an application code into an application routine comprising code of the first and second instances of code, and selectively replacing the lock instruction with the lock marker in the first instance of code.

Any of the above examples of a computer-implemented method in which the method includes compiling the application code into the application routine each time the application routine is to be executed by the processor component.

Any of the above examples of a computer-implemented method in which the first and second instances of code include a common portion of code of the application code.

Any of the above examples of a computer-implemented method in which the first and second instances of code include different portions of code of the application code.

Any of the above examples of a computer-implemented method in which the method includes transmitting an indication of an update to the history data to a code server.

Any of the above examples of a computer-implemented method in which the method includes signaling the code server to provide a newer version of the history data in response to receiving a newer version of the application code.

An example of at least one machine-readable storage medium includes instructions that when executed by a computing device, cause the computing device to retrieve a history data stored in a storage of the computing device and indicating at least one result of a replacement of a lock instruction of a first instance of code with a lock marker, analyze the at least one result, and replace the lock instruction with the lock marker based on analysis of the at least one result to allow a processor component of the computing device to speculatively execute a second instance of code, the first and second instances of code to access a resource and the lock instruction to request a lock of access to the resource to the first instance of code.

The above example of at least one machine-readable storage medium in which the computing device is caused to speculatively execute the second instance of code concurrently with executing the first instance of code based on replacement of the lock instruction with the lock marker, and monitor execution of the first and second instances of code for contention over access to the resource.

Either of the above examples of at least one machine-readable storage medium in which the computing device is caused to abort execution of at least one of the first and second instances of code based on an occurrence of contention.

Any of the above examples of at least one machine-readable storage medium in which the computing device is caused to update the history data with an indication of whether contention occurs.

Any of the above examples of at least one machine-readable storage medium in which the computing device is caused to replace the lock instruction with the lock marker in response to a selected interval of time elapsing since a last occurrence of replacement of the lock instruction with the lock marker in which contention resulted.

Any of the above examples of at least one machine-readable storage medium in which the computing device is caused to compile an application code into an application routine comprising code of the first and second instances of code, and selectively replace the lock instruction with the lock marker in the first instance of code.

Any of the above examples of at least one machine-readable storage medium in which the computing device is caused to compile the application code into the application routine each time the application routine is to be executed by the processor component.

Any of the above examples of at least one machine-readable storage medium in which the first and second instances of code include a common portion of code of the application code.

Any of the above examples of at least one machine-readable storage medium in which the first and second instances of code include different portions of code of the application code.

Any of the above examples of at least one machine-readable storage medium in which the computing device is caused to transmit an indication of an update to the history data to a code server.

Any of the above examples of at least one machine-readable storage medium in which the computing device is caused to signal the code server to provide a newer version of the history data in response to receiving a newer version of the application code.

An example of an apparatus to control locking of a resource includes means for performing any of the above examples.

An example of at least one machine readable storage medium includes instructions that when executed by a computing device, causes the computing device to perform any of the above examples.

The invention claimed is:

1. An apparatus to control locking of a resource comprising:
    a processor component;
    memory storing one or more instructions executable by the processor component, the instructions when executed by the processor component to cause the processor component to:
    compile an application code into an application routine comprising code of first and second instances of code, the first and second instances of code comprising a common portion of code of the application code or different portions of code of the application code;
    determine whether an indication of past results of allowing sharing of a resource requested to be locked for the first and second instances of code exists;
    in response to determining the indication of past results does not exist, replace a lock instruction of the first instance of code with a lock marker;
    in response to determining the indication of past results exists, determine whether a specified time interval has elapsed or not elapsed for the indication of past results since a last occurrence of replacement of the lock instruction with the lock marker in which contention resulted;
    in response to determining the specified time interval has elapsed, replace the lock instruction of the first instance of code with the lock marker; and
    in response to determining the specified time interval has not elapsed, analyze at least one result of a replacement of the lock instruction of the first instance of code with the lock marker to allow the processor component to speculatively execute the second instance of code, and replace the lock instruction with the lock marker in the first instance of code based on analysis of the at least one result, the first and second instances of code to access a resource and the lock instruction to request a lock of access to the resource to the first instance of code.

2. The apparatus of claim 1, the processor component to retrieve an indication of the result from a history data.

3. The apparatus of claim 2, the processor component comprising a lock handler to speculatively execute the second instance of code concurrently with execution of the first instance of code in response to replacement of the lock instruction with the lock marker, and to monitor execution of the first and second instances of code for contention over access to the resource.

4. The apparatus of claim 3, the lock handler to abort execution of at least one of the first and second instances of code in response to an occurrence of contention.

5. The apparatus of claim 3, comprising a history updater for execution by the processor component to update the history data with an indication of whether contention occurs.

6. The apparatus of claim 2, comprising an interface to receive the history data from a code server via a network following loss of the history data due to a re-initialization, and to transmit an update to the history data to the code server via the network.

7. An apparatus to control locking of a resource comprising:
    a processor component;
    a compiler for execution by the processor component to compile an application code to generate an application routine comprising code of first and second instances of code, the first and second instances of code comprising a common portion of code of the application code or different portions of code of the application code;
    a locking component for execution by the processor component to:
        determine whether an indication of past results of allowing sharing of a resource requested to be locked for the first and second instances of code exists;
        in response to determining the indication of past results does not exist, replace a lock instruction of the first instance of code with a lock marker;
        in response to determining the indication of past results exists, determine whether a specified time interval has elapsed or not elapsed for the indication of past results since a last occurrence of replacement of the lock instruction with the lock marker in which contention resulted;
        in response to determining the specified time interval has elapsed, replace the lock instruction of the first instance of code with the lock marker; and
        in response to determining the specified time interval has not elapsed, selectively replace the lock instruction of the application code with the lock marker in the application routine based on an analysis of the indication of the past results, the lock instruction to request a lock of access to a resource and the lock marker to not request a lock of access to the resource.

8. The apparatus of claim 7, the locking component to retrieve an indication of past results of an earlier replacement of the lock instruction with the lock marker from a history data and to analyze the indication of past results.

9. The apparatus of claim 8, comprising a history updater for execution by the processor component to update the history data with an indication of whether contention over access to the resource occurs in response to replacement of the lock instruction with the lock marker.

10. The apparatus of claim 9, comprising an interface to transmit an indication of an update to the history data by the history updater to a code server.

11. The apparatus of claim 10, comprising a versioning component for execution by the processor component to signal the code server to provide a newer version of the history data in response to receipt of a newer version of the application code.

12. A computer-implemented method for controlling locking of a resource comprising:
    compiling, by a computing device, an application code into an application routine comprising code of first and second instances of code, the first and second instances of code comprising a common portion of code of the application code or different portions of code of the application code;

retrieving, by the computing device, a stored history data indicating at least one result of a replacement of a lock instruction of a first instance of code with a lock marker;

determining, by the computing device, whether a specified time interval has elapsed or not elapsed for the indication of at least one result since a last occurrence of replacement of the lock instruction with the lock marker in which contention resulted;

in response to determining the specified time interval has elapsed, replacing, by the computing device, the lock instruction of the first instance of code with the lock marker; and in response to determining the specified time interval has not elapsed, analyzing, by the computing device, the at least one result and replacing the lock instruction with the lock marker in the first instance of code based on the analysis of the at least one result to cause a processor component to speculatively execute a second instance of code, the first and second instances of code to access a resource and the lock instruction to request a lock of access to the resource to the first instance of code.

13. The computer-implemented method of claim 12, comprising:

speculatively executing the second instance of code concurrently with executing the first instance of code based on replacement of the lock instruction with the lock marker; and monitoring execution of the first and second instances of code for contention over access to the resource.

14. The computer-implemented method of claim 13, comprising updating the history data with an indication of whether contention occurs.

15. At least one non-transitory machine-readable storage medium comprising instructions that when executed by a computing device, cause the computing device to:

compile an application code into an application routine comprising code of first and second instances of code, the first and second instances of code comprising a common portion of code of the application code or different portions of code of the application code;

retrieve a history data stored in a storage of the computing device and indicating at least one result of a replacement of a lock instruction of a first instance of code with a lock marker;

determine whether a specified time interval has elapsed or not elapsed for the indication of at least one result since a last occurrence of replacement of the lock instruction with the lock marker in which contention resulted;

in response to determining the specified time interval has elapsed, replace the lock instruction of the first instance of code with the lock marker; and in response to determining the specified time interval has not elapsed, analyze the at least one result and replace the lock instruction with the lock marker in the first instance of code based on analysis of the at least one result to allow a processor component of the computing device to speculatively execute a second instance of code, the first and second instances of code to access a resource and the lock instruction to request a lock of access to the resource to the first instance of code.

16. The at least one machine-readable storage medium of claim 15, the computing device caused to:

speculatively execute the second instance of code concurrently with executing the first instance of code based on replacement of the lock instruction with the lock marker; and monitor execution of the first and second instances of code for contention over access to the resource.

17. The at least one machine-readable storage medium of claim 16, the computing device caused to abort execution of at least one of the first and second instances of code based on an occurrence of contention.

18. The at least one machine-readable storage medium of claim 16, the computing device caused to update the history data with an indication of whether contention occurs.

* * * * *